United States Patent
Lu et al.

(10) Patent No.: US 10,067,320 B2
(45) Date of Patent: Sep. 4, 2018

(54) LENS MODULE

(71) Applicant: HIMAX TECHNOLOGIES LIMITED, Tainan (TW)

(72) Inventors: Yin-Dong Lu, Tainan (TW); Han-Ching Lin, Tainan (TW); Yu-Feng Yen, Tainan (TW); Chung-Hsiang Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 14/936,692

(22) Filed: Nov. 10, 2015

(65) Prior Publication Data
US 2017/0131529 A1    May 11, 2017

(51) Int. Cl.
*G02B 13/00* (2006.01)
*G02B 7/02* (2006.01)
*G02B 7/18* (2006.01)
*H04N 5/225* (2006.01)

(52) U.S. Cl.
CPC ......... *G02B 13/0065* (2013.01); *G02B 7/025* (2013.01); *G02B 7/1805* (2013.01); *G02B 13/007* (2013.01); *H04N 5/2254* (2013.01)

(58) Field of Classification Search
CPC .......... G02B 7/18; G02B 7/022; G02B 7/182; G02B 5/04; G02B 5/045; G02B 13/0065; G02B 13/007; H04N 5/2254
See application file for complete search history.

(56) References Cited

U.S. PATENT DOCUMENTS

| 6,072,634 | A | 6/2000 | Broome |
| 7,554,749 | B2 | 6/2009 | Eguchi |
| 7,991,290 | B2 | 8/2011 | Tanaka |
| 2012/0182458 | A1* | 7/2012 | Ishii .................. A61B 1/00096 348/340 |
| 2015/0092270 | A1 | 4/2015 | Wang |

FOREIGN PATENT DOCUMENTS

| CN | 2665732 Y | 12/2004 |
| CN | 1906517 A | 1/2007 |
| CN | 1983880 A | 6/2007 |
| TW | 200807018 | 2/2008 |
| TW | 201116876 A1 | 5/2011 |
| TW | 201411217 A | 3/2014 |
| TW | 201430434 A | 8/2014 |

* cited by examiner

*Primary Examiner* — Darryl J Collins
*Assistant Examiner* — Journey Sumlar
(74) *Attorney, Agent, or Firm* — Winston Hsu (57) ABSTRACT

A lens module includes a lens set and a prism. The lens set has a first light emitting surface and a first engaging structure, wherein the first engaging structure is formed on the first light emitting surface. The prism is disposed adjacent to the lens set. The prism has a light incident surface and a second engaging structure, wherein the second engaging structure is formed on the light incident surface. The lens set and the prism are assembled with each other by engaging the first engaging structure with the second engaging structure.

8 Claims, 9 Drawing Sheets

LENS MODULE

BACKGROUND OF THE INVENTION

1. Field of the Invention

The invention relates to a lens module and, more particularly, to a lens module capable of preventing decenter between a lens set and a prism.

2. Description of the Prior Art

Figure 1:
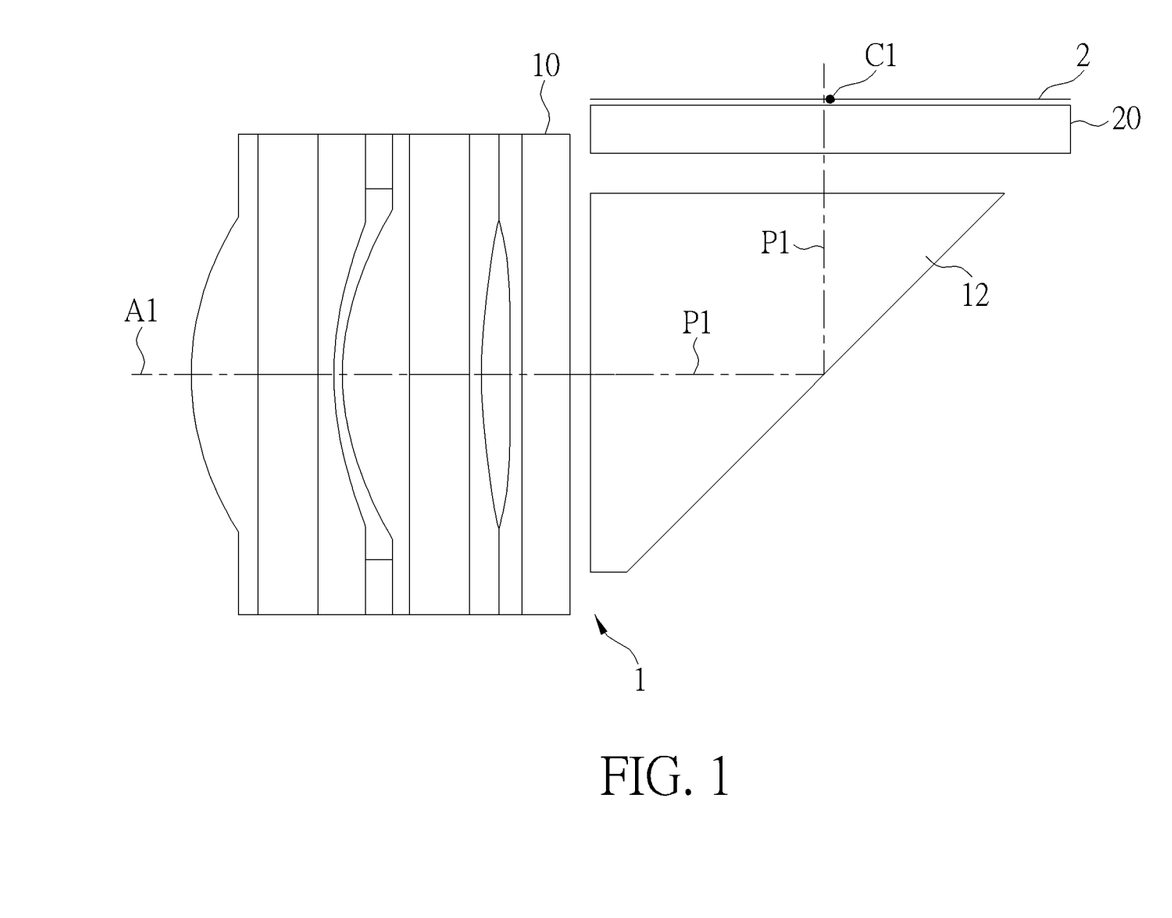
FIG. 1 is a schematic view illustrating a lens module of the prior art.

Referring to FIG. 1, FIG. 1 is a schematic view illustrating a lens module 1 of the prior art. As shown in FIG. 1, the lens module 1 comprises a lens set 10 and a prism 12. The lens set 10 consists of a plurality of lenses stacked with each other. The prism 12 is disposed adjacent to the lens set 10. Furthermore, an image sensor 2 is disposed adjacent to the prism 12. Moreover, there may be a cover glass 20 disposed in front of the image sensor 2 according to practical applications. In the prior art, the prism 12 is made of glass and attached onto the lens set 10 by glue. Through the aforesaid manner, the prism 12 may be decentered with respect to an optical axis A1 of the lens set 10, such that an imaging path P1 formed by the prism 12 may be decentered with respect to a center C1 of the image sensor 2. Consequently, the quality of an image generated by the image sensor 2 will be influenced.

SUMMARY OF THE INVENTION

The invention provides a lens module capable of preventing decenter between a lens set and a prism, so as to solve the aforesaid problems.

According to an embodiment of the invention, a lens module comprises a lens set and a prism. The lens set has a first light emitting surface and a first engaging structure, wherein the first engaging structure is formed on the first light emitting surface. The prism is disposed adjacent to the lens set. The prism has a light incident surface and a second engaging structure, wherein the second engaging structure is formed on the light incident surface. The lens set and the prism are assembled with each other by engaging the first engaging structure with the second engaging structure.

As mentioned in the above, since the lens set and the prism are assembled with each other by engaging the first engaging structure with the second engaging structure, the invention can center and position the prism with respect to an optical axis of the lens set through the first engaging structure and the second engaging structure, such that an imaging path formed by the prism can be centered with respect to a center of an image sensor. Consequently, the quality of an image generated by the image sensor will be good.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
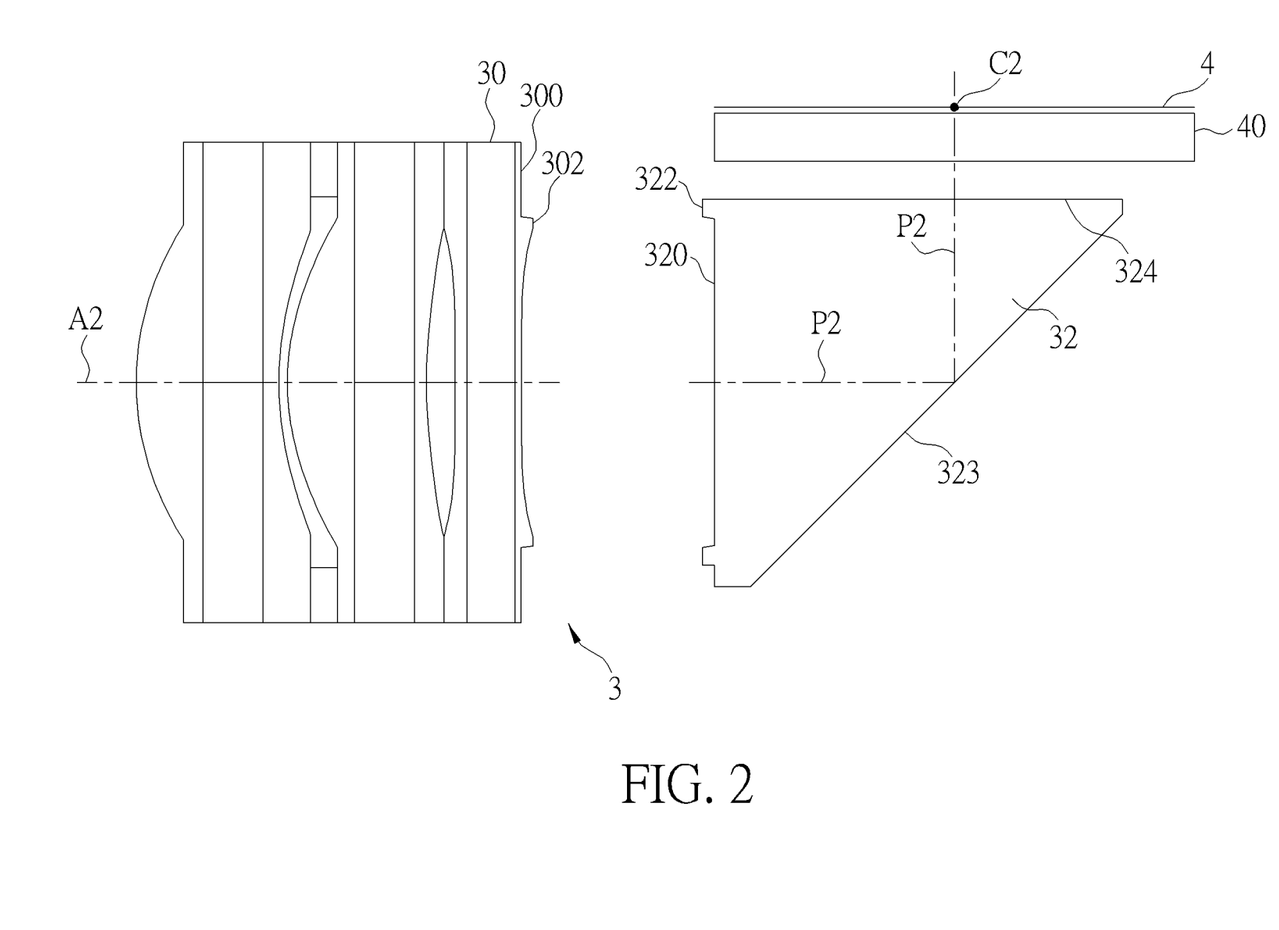
FIG. 2 is an exploded view illustrating a lens module according to an embodiment of the invention.
Figure 3:
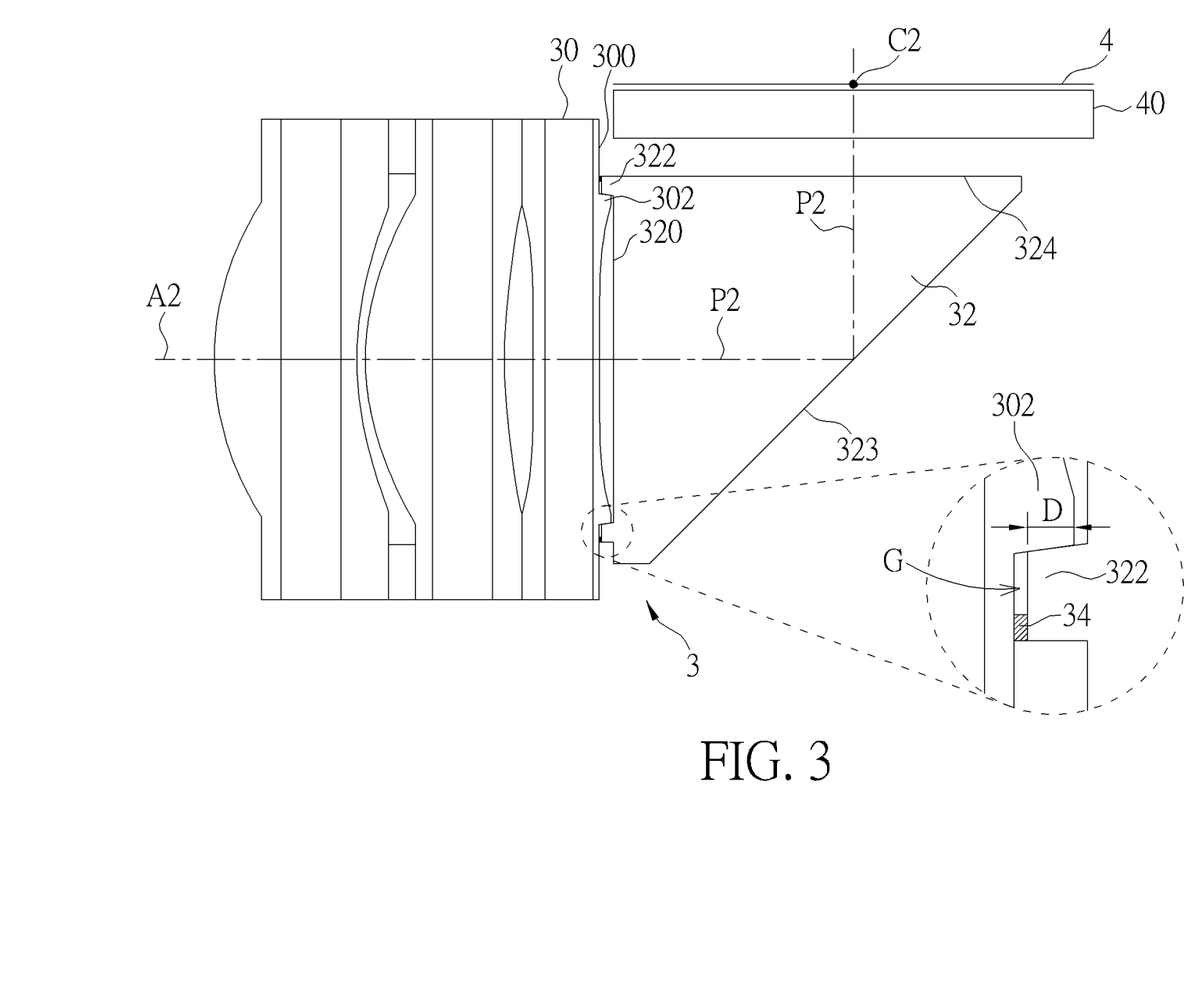
FIG. 3 is an assembly view illustrating the lens module shown in FIG. 2.

Referring to FIGS. 2 and 3, FIG. 2 is an exploded view illustrating a lens module 3 according to an embodiment of the invention, and FIG. 3 is an assembly view illustrating the lens module 3 shown in FIG. 2.

As shown in FIGS. 2 and 3, the lens module 3 comprises a lens set 30 and a prism 32. The lens module 3 may be applied to a camera or other optical devices. The lens set 30 may consist of a plurality of lenses stacked with each other, wherein the type and the number of the lenses may be determined according to practical applications, so the lens set 30 is not limited to the embodiment shown in FIGS. 2 and 3.

The lens set 30 has a first light emitting surface 300 and a first engaging structure 302, wherein the first engaging structure 302 is formed on the first light emitting surface 300. In this embodiment, the first engaging structure 302 may be formed on the first light emitting surface 300 by a compression molding process. The prism 32 is disposed adjacent to the lens set 30.

The prism 32 has a light incident surface 320, a second engaging structure 322, a light reflection surface 323 and a second light emitting surface 324, wherein the second engaging structure 322 is formed on the light incident surface 320. Light passing through the light incident surface 320 can be reflected by the light reflection surface 323 and then passes through the second light emitting surface 324, such that an imaging path P2 is defined from the light incident surface 320 to the second light emitting surface 324. In this embodiment, the prism 32 may be made of plastic through an injection molding process, so as to form the second engaging structure 322 on the light incident surface 320.

Furthermore, an image sensor 4 is disposed on the imaging path P2 and faces the second light emitting surface 324, wherein the imaging path P2 passes through a center C2 of the image sensor 4. Moreover, there may be a cover glass 40 disposed in front of the image sensor 4 according to practical applications.

As shown in FIG. 3, the lens set 30 and the prism 32 can be assembled with each other by engaging the first engaging structure 302 with the second engaging structure 322, so as to center and position the prism 32 with respect to an optical axis A2 of the lens set 30 through the first engaging structure 302 and the second engaging structure 322. In other words, the optical axis A2 of the lens set 30 will be aligned with the imaging path P2 when the first engaging structure 302 is engaged with the second engaging structure 322. Accordingly, the imaging path P2 formed by the prism 32 can be centered with respect to the center C2 of the image sensor 4. Consequently, the quality of an image generated by the image sensor 4 will be good. In this embodiment, the first engaging structure 302 is engaged with the second engaging structure 322 in a tight-fitting manner, so as to prevent decenter between the lens set 30 and the prism 32.

In this embodiment, the first engaging structure 302 and the second engaging structure 322 may be, but not limited to, taper-shaped (or wedge-shaped) structures. The taper-shaped structures may result in better engagement between the first engaging structure 302 and the second engaging structure 322. Furthermore, a contact depth D between the first engaging structure 302 and the second engaging structure 322 may be larger than 0.1 mm preferably when the first engaging structure 302 is engaged with the second engaging structure 322, so as to ensure stable and strong engagement between the first engaging structure 302 and the second engaging structure 322. Moreover, a gap G may exist between the lens set 30 and the prism 32 when the first engaging structure 302 is engaged with the second engaging structure 322. Therefore, the lens module 3 may further comprise a glue 34 disposed in the gap G, so as to fix the lens set 30 and the prism 32 after solidifying the glue 34.

Figure 4:
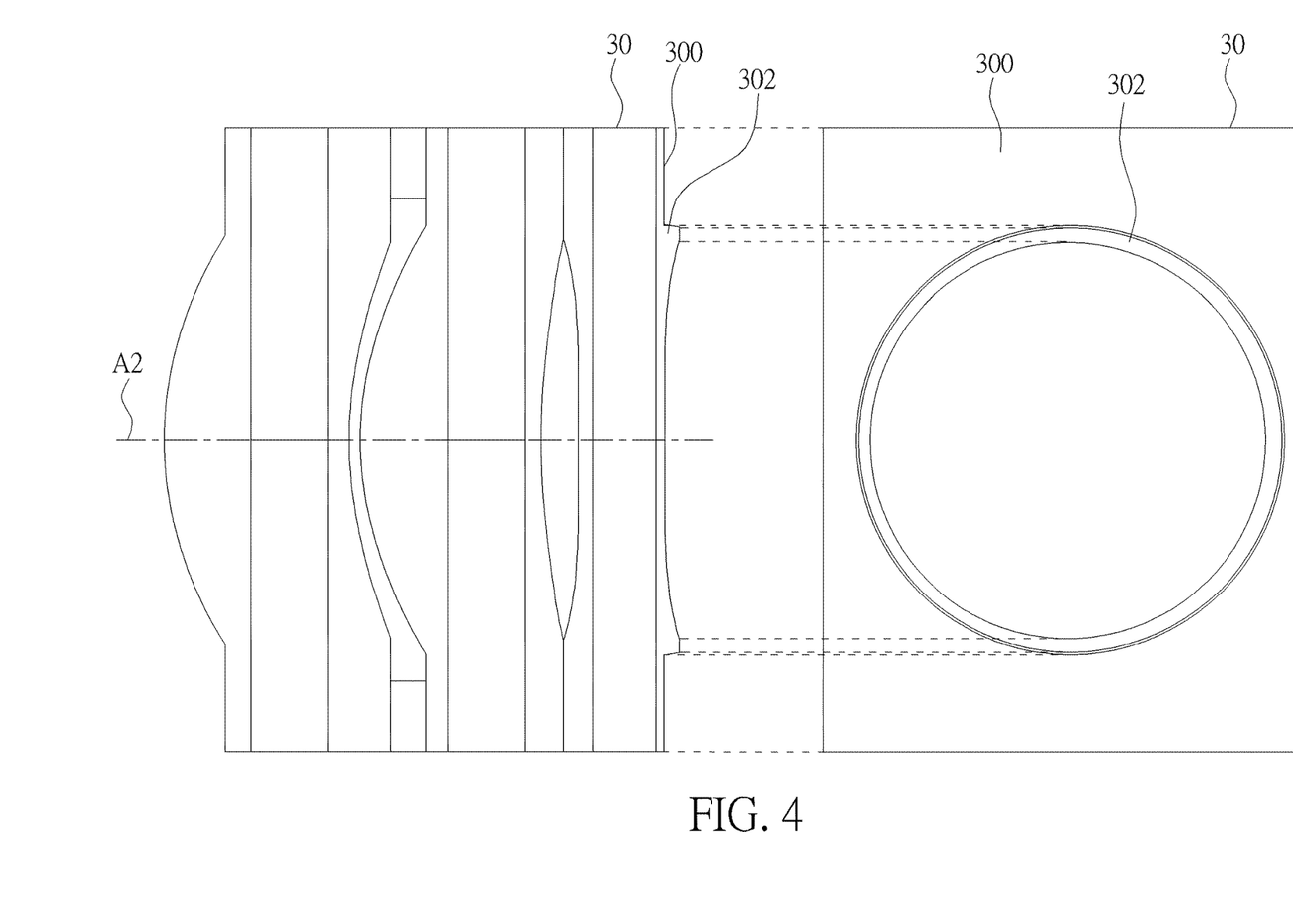
FIG. 4 illustrates a top view and a sectional view of the lens set shown in FIG. 2 according to an embodiment of the invention.

Referring to FIG. 4, FIG. 4 illustrates a top view and a sectional view of the lens set 30 shown in FIG. 2 according to an embodiment of the invention. As shown in FIG. 4, the first engaging structure 302 of the lens set 30 may be continuous ring-shaped structure. Accordingly, the second engaging structure 322 of the prism 32 also may be continuous ring-shaped structure corresponding to the first engaging structure 302 of the lens set 30.

Figure 5:
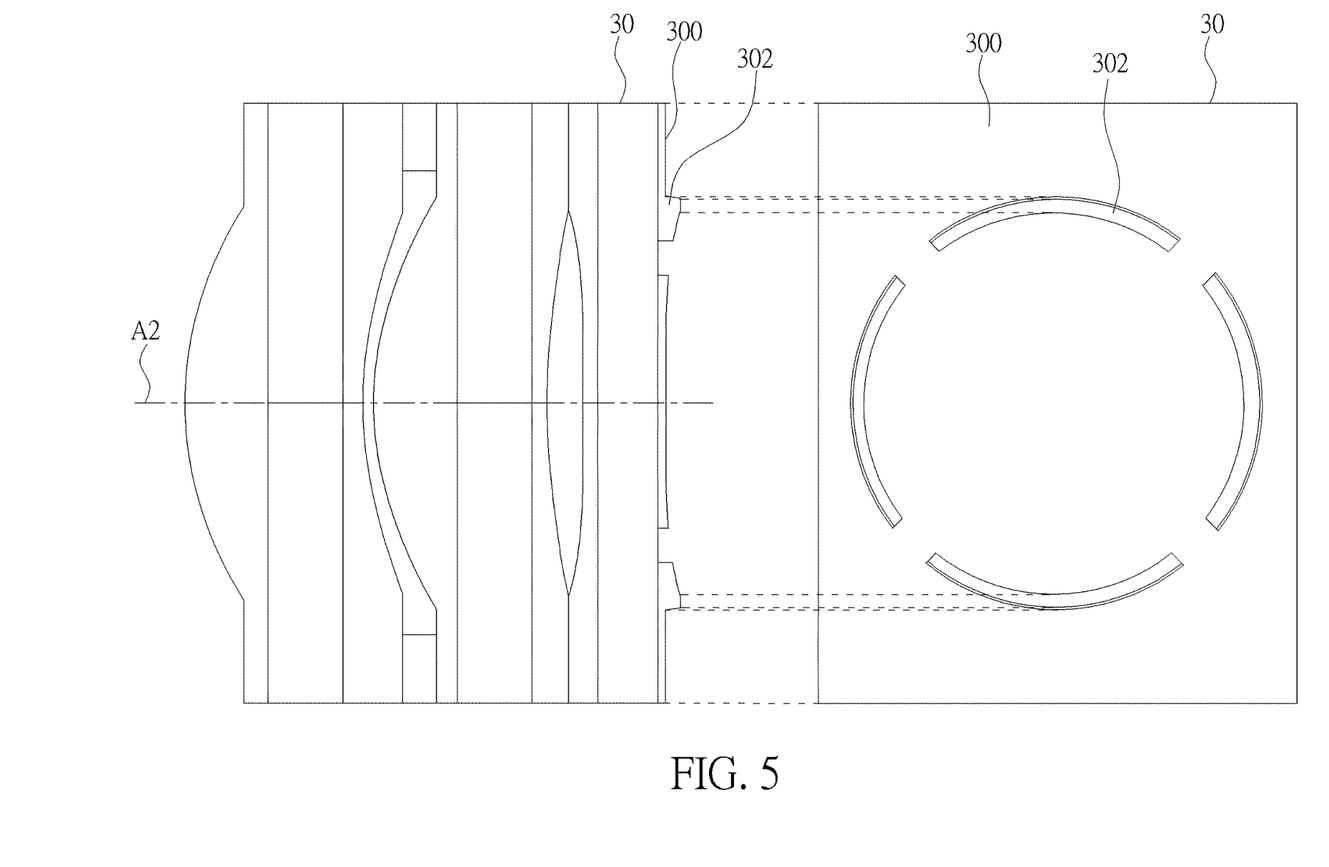
FIG. 5 illustrates a top view and a sectional view of the lens set shown in FIG. 2 according to another embodiment of the invention.

Referring to FIG. 5, FIG. 5 illustrates a top view and a sectional view of the lens set 30 shown in FIG. 2 according to another embodiment of the invention. As shown in FIG. 5, the first engaging structure 302 of the lens set 30 may be non-continuous ring-shaped structure. Accordingly, the second engaging structure 322 of the prism 32 also may be non-continuous ring-shaped structure corresponding to the first engaging structure 302 of the lens set 30.

In other words, according to the embodiments shown in FIGS. 4 and 5, the first engaging structure 302 of the lens set 30 and the second engaging structure 322 of the prism 32 may be continuous ring-shaped structures or non-continuous ring-shaped structures.

Figure 6:
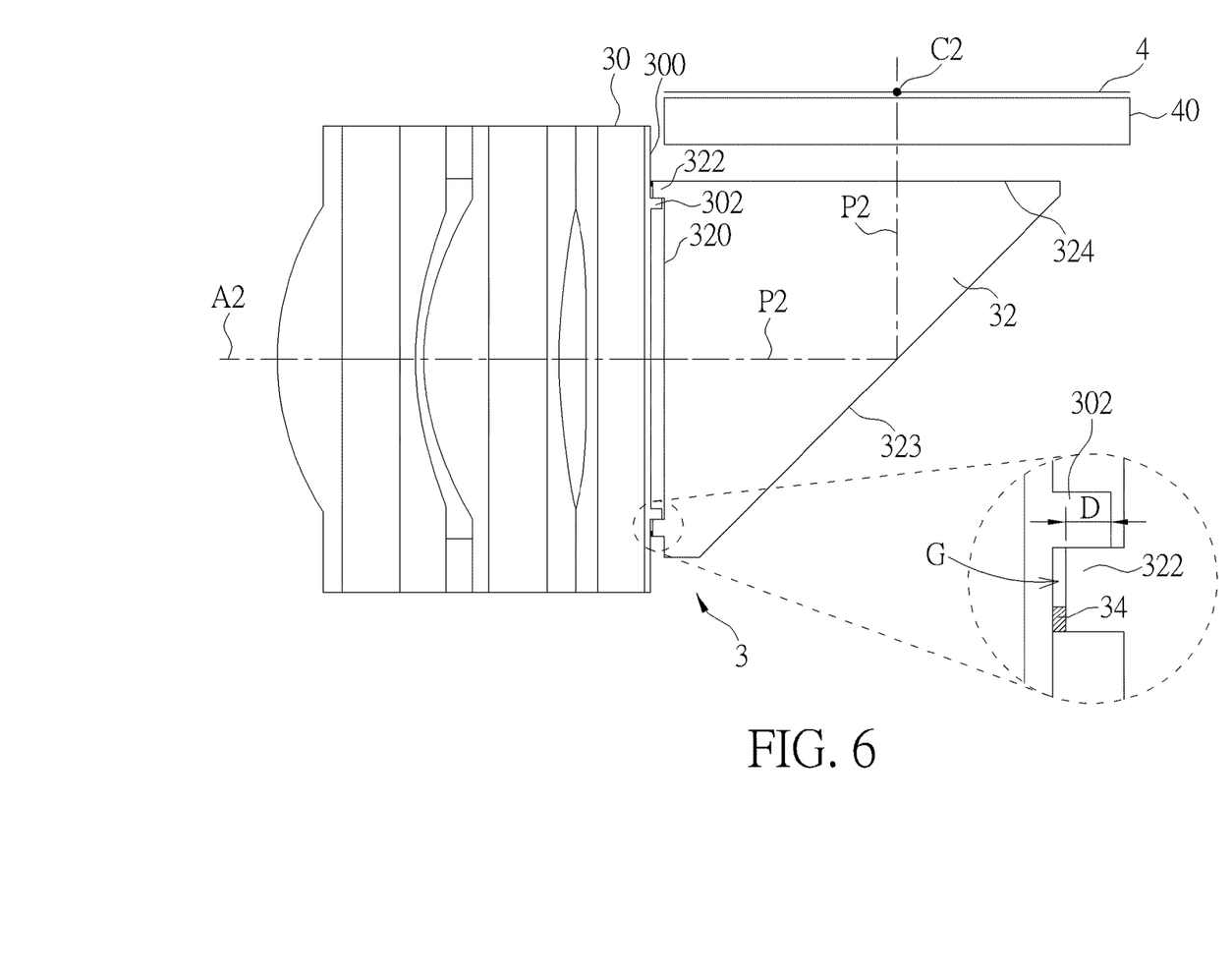
FIG. 6 is an assembly view illustrating the lens module shown in FIG. 2 according to another embodiment.

Referring to FIG. 6, FIG. 6 is an assembly view illustrating the lens module 3 shown in FIG. 2 according to another embodiment. As shown in FIG. 6, compared to the embodiment shown in FIG. 3, the first engaging structure 302 of the lens set 30 and the second engaging structure 322 of the prism 32 may be formed as pillar-shaped structures.

Figure 7:
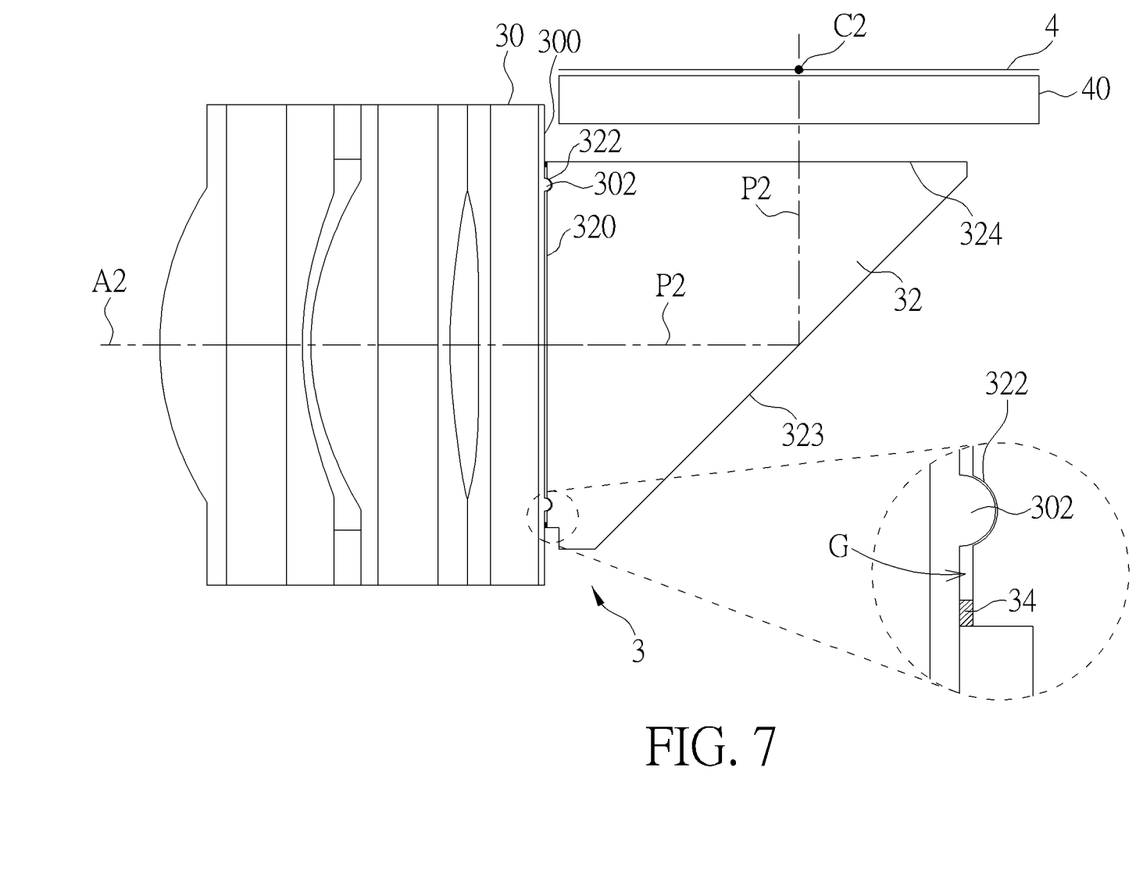
FIG. 7 is an assembly view illustrating the lens module shown in FIG. 2 according to another embodiment.

Referring to FIG. 7, FIG. 7 is an assembly view illustrating the lens module 3 shown in FIG. 2 according to another embodiment. As shown in FIG. 7, compared to the embodiment shown in FIG. 3, the first engaging structure 302 of the lens set 30 and the second engaging structure 322 of the prism 32 may be formed as spherical structures.

Figure 8:
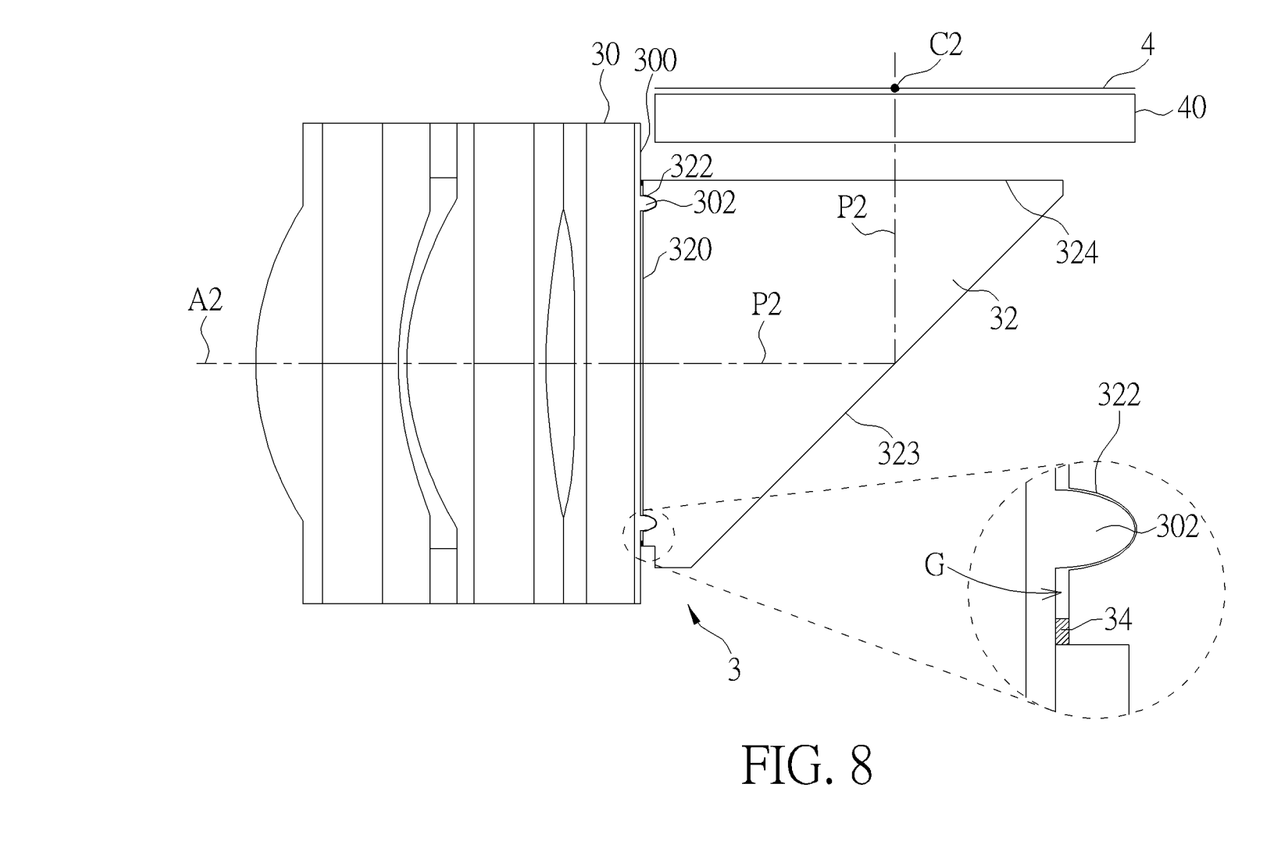
FIG. 8 is an assembly view illustrating the lens module shown in FIG. 2 according to another embodiment.

Referring to FIG. 8, FIG. 8 is an assembly view illustrating the lens module 3 shown in FIG. 2 according to another embodiment. As shown in FIG. 8, compared to the embodiment shown in FIG. 3, the first engaging structure 302 of the lens set 30 and the second engaging structure 322 of the prism 32 may be formed as non-spherical structures, such as oval-shaped structures, parabola-shaped structures or the like.

In other words, according to the embodiments shown in FIGS. 3 and 6-8, the first engaging structure 302 of the lens set 30 and the second engaging structure 322 of the prism 32 may be taper-shaped structures, pillar-shaped structures, spherical structures or non-spherical structures.

Figure 9:
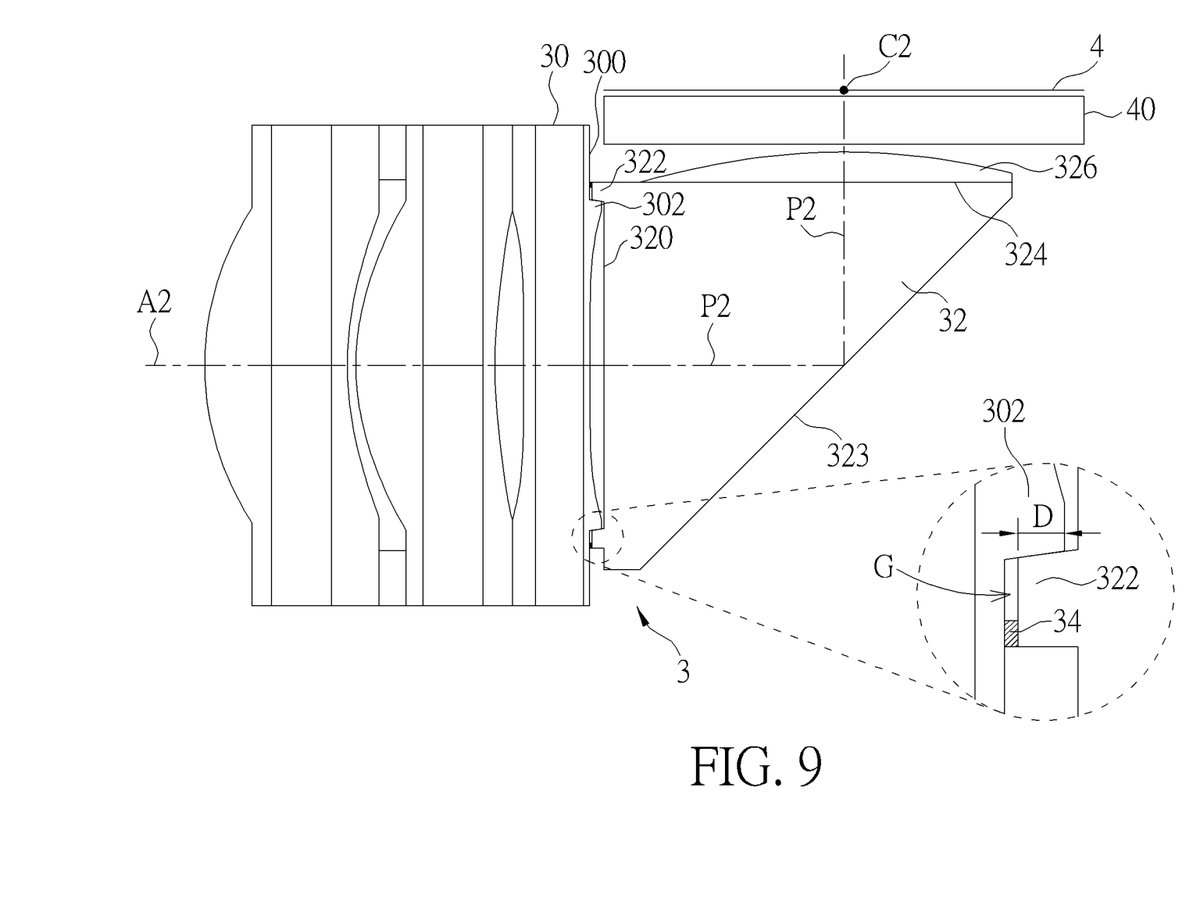
FIG. 9 is an assembly view illustrating the lens module shown in FIG. 2 according to another embodiment.

Referring to FIG. 9, FIG. 9 is an assembly view illustrating the lens module 3 shown in FIG. 2 according to another embodiment. As shown in FIG. 9, compared to the embodiment shown in FIG. 3, the prism 32 may further have a lens structure 326 formed on the second light emitting surface 324. In this embodiment, the lens structure 326 may be formed on the second light emitting surface 324 integrally through an injection molding process. In another embodiment, the lens structure 326 may be attached on the second light emitting surface 324 independently. It should be noted that the type of the lens structure 326 may be determined according to practical applications, so it is not limited to the embodiment shown in FIG. 9.

As mentioned in the above, since the lens set and the prism are assembled with each other by engaging the first engaging structure with the second engaging structure, the invention can center and position the prism with respect to the optical axis of the lens set through the first engaging structure and the second engaging structure, such that the imaging path formed by the prism can be centered with respect to the center of the image sensor. Consequently, the quality of an image generated by the image sensor will be good.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lens module comprising:
a lens set having a first light emitting surface and a first engaging structure, the first engaging structure being formed on the first light emitting surface in one-piece; and
a prism disposed adjacent to the lens set, the prism having a light incident surface, a second light emitting surface, a lens structure and a second engaging structure, the second engaging structure being formed on the light incident surface in one-piece, the lens structure being formed in direct contact to the second light emitting surface;
wherein the lens set and the prism are assembled with each other by engaging the first engaging structure with the second engaging structure.

2. The lens module of claim 1, wherein the first engaging structure is engaged with the second engaging structure in a tight-fitting manner.

3. The lens module of claim 1, wherein the first engaging structure and the second engaging structure are taper-shaped structures, pillar-shaped structures, spherical structures or non-spherical structures.

4. The lens module of claim 1, wherein the first engaging structure and the second engaging structure are continuous ring-shaped structures or non-continuous ring-shaped structures.

5. The lens module of claim 1, wherein an imaging path is defined from the light incident surface to the second light emitting surface, an image sensor is disposed on the imaging path and faces the second light emitting surface, the imaging path passes through a center of the image sensor, and an optical axis of the lens set is aligned with the imaging path when the first engaging structure is engaged with the second engaging structure.

6. The lens module of claim 1, wherein a contact depth between the first engaging structure and the second engaging structure is larger than 0.1 mm when the first engaging structure is engaged with the second engaging structure.

7. The lens module of claim 1, wherein a gap exists between the lens set and the prism when the first engaging structure is engaged with the second engaging structure.

8. The lens module of claim 7, further comprising a glue disposed in the gap, so as to fix the lens set and the prism.

* * * * *